United States Statutory Invention Registration [19]

[11] Reg. Number: H617

Hertelendy [43] Published: Apr. 4, 1989

[54] CLOSURE SYSTEM

[75] Inventor: Nicholas A. Hertelendy, Kennewick, Wash.

[73] Assignee: The United States of America as represented by the United States Department of Energy, Washington, D.C.

[21] Appl. No.: 41,267

[22] Filed: Apr. 22, 1987

[51] Int. Cl.[4] ..... B65B 7/28; B67B 1/00

[52] U.S. Cl. ..... 53/486; 53/330; 53/489

[58] Field of Search ..... 53/173, 264, 330, 449, 53/486, 489; 215/355, 361; 220/307

[56] References Cited

U.S. PATENT DOCUMENTS

| | | | |
|---|---|---|---|
| 280,234 | 6/1883 | Pearson | 53/264 |
| 299,676 | 6/1884 | Poland | 215/361 |
| 927,801 | 7/1909 | Jenkins | 53/486 |
| 1,585,820 | 5/1926 | Baum | 53/330 |
| 1,641,742 | 9/1927 | Dawson | 53/486 |
| 3,244,308 | 4/1966 | Esposito | 215/361 |

*Primary Examiner*—Charles T. Jordan
*Assistant Examiner*—Michael J. Carone
*Attorney, Agent, or Firm*—Robert Southworth, III; Judson R. Hightower

[57] ABSTRACT

A pressure resistant seal for a metallic container is formed between a cylindrical portion having one end open and a cap which seals the open end of the shell. The cap is in the form of a frusto-conical flange which is inserted narrow end first into the open end of the shell and the container is sealed by means of a capping tool which pulls the flange against a die, deforming the flange and forcing the edge of the flange into the wall of the shell.

6 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CLOSURE SYSTEM

The U.S. Government has rights in this invention pursuant to Contract No. DE-AC06-77RL01030 between the U.S. Department of Energy and Rockwell International Corporation.

BACKGROUND OF THE INVENTION

This invention relates generally to the field of closures for metallic containers and more specifically to an improved pressure resistant closure for a metallic container which is produced without heat.

Sealed metallic containers are used for the storage of many dangerous or reactive materials. When the contents of such a container are either extremely toxic or are radioactive, the seal of such a container must be air-tight and even pressure resistant. Most methods of making a pressure resistant seal on a metallic container involve the use of heat (e.g. welding). Such methods are unsuitable for sealing containers whose contents are flammable, explosive, or otherwise reactive.

Radioactive materials, such as sources or waste products, need to be handled remotely to minimize worker exposure. Extremely toxic materials, such as certain pesticides, herbicides, and chemical warfare agents, as well as biological agents and products of genetic engineering, also require remote handling.

While the present invention is useful for forming a pressure-resistant storage container for any type of material, the invention is especially useful as an overpack for a leaking container of hazardous or radioactive material. Overpacking containers in current use range from cardboard or plastic containers to metal 55 gallon drums. A more sophisticated overpack design is U.S. Pat. No. 4,100,860, which discloses an overpack of laminar construction having a layer of foamed polyurethane between its inner and outer shells.

One situation in which careful overpacking is especially important is in the storage of cesium and strontium capsules. Cesium and strontium are byproducts of the reprocessing of nuclear fuel. The surface dose rate of cesium capsules can be as high as 15,000 R/hr and strontium capsules can generate as much as 500–700 watts of thermal power. Because of the high dose rate and heat production of the elements, it is desirable to remove the elements from reprocessing waste before any storage of that waste. Current practice for both elements is to encapsulate them in stainless steel and store the capsules under water, which provides both shielding and cooling of the capsules.

If a capsule should develop a leak, the leaking capsule must be overpacked with an external cannister to prevent the release of radioactivity. Due to the high levels of radioactivity, such overpacking should be done remotely and beneath the surface of the water. The effects of heat and of radioactivity make the use of any organic sealing material impossible. Any water left inside the overpack will, by radiolysis, be broken down into hydrogen and oxygen, creating the possibility of fire or explosion so the overpack seal must be both air tight and pressure resistant.

SUMMARY OF THE INVENTION

Accordingly, it is an object of the present invention to obviate the above-noted disadvantages by providing an improved method of and apparatus for the sealing of metallic containers that is simple to use and fabricate and can be used remotely.

Another object of the invention is to provide such a method of and apparatus that requires no heat and is air-tight and pressure resistant.

Another object of the invention is to provide such method and apparatus that is resistant to damage from radiation.

The above objects are attained by utilizing a cylindrical container shell which is open at one end and a cap having a frusto-conical flange which is inserted narrow end first into the open end of the shell and fits closely therein. Force is applied to the flange of the cap, deforming it outwardly toward a more flattened position. The periphery of the flange of the cap is thus pressed tightly into and deforms the wall of the cylindrical shell. This creates a tight seal which is gas and liquid tight and pressure resistant. The flange of the cap must itself be deformed sufficiently to prevent its springing back when the pressure on it is released.

In more detail, the cap comprises a frusto-conical flange surrounding a central stem. The cap is inserted into the container shell by a capping tool which grips the stem. Force is then applied by the capping tool in such a manner as to hold the container stable while forcing the cap against a die, deforming the cap as has been explained above.

Other objects, advantages, and novel features of this invention will be apparent to those of ordinary skill in the art upon examination of the following detailed description of a preferred embodiment thereof together with the accompanying drawings.

DETAILED DESCRIPTION OF A PREFERRED EMBODIMENT OF THE INVENTION

Figure 1:
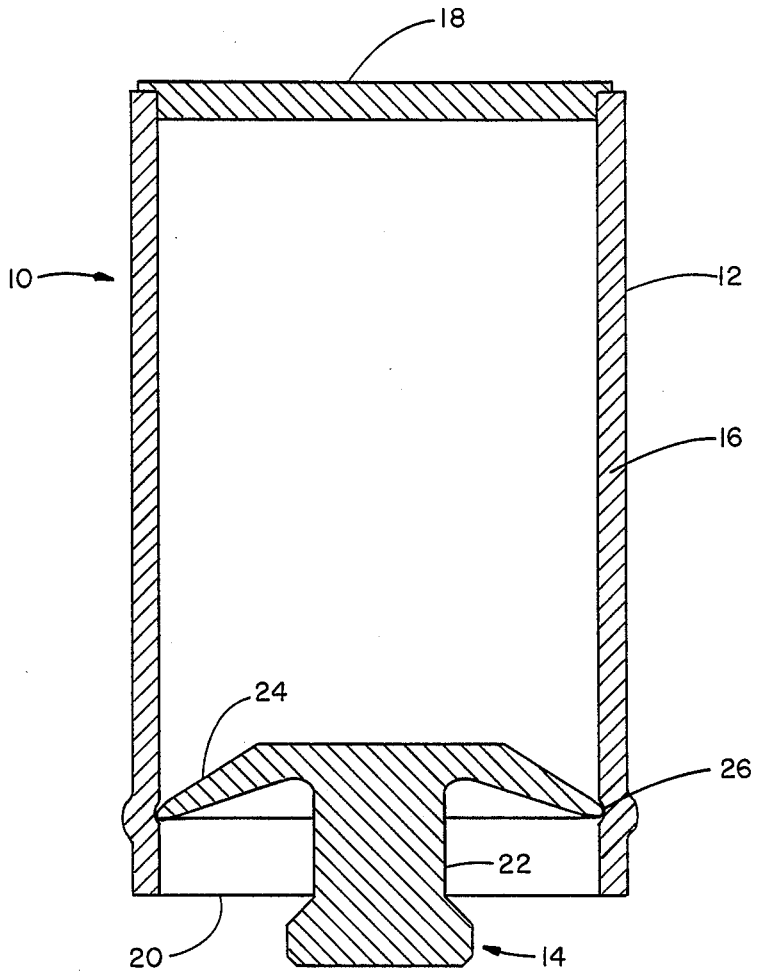
FIG. 1 is a vertical section of the sealed container shell and cap.

In FIG. 1 is shown a sealed metallic container generally designated 10, which is comprised of shell 12 and cap 14. Shell 12 comprises a wall 16 with a closed end 18 and open end 20. Cap 14 which is inserted into the open end 20 of shell 12 has a stem 22 and a frusto-conical flange 24 surrounding stem 22. The wide end of flange 24 projects toward stem portion 22. Cap 14 forms a seal 26 with the wall 16 of shell 12. This seal 26 is a deformation of the metal of wall 16 of shell 12 and is produced when flange 24 of cap 14 is forced into wall 16.

In one embodiment of this invention, the relative dimensions and thickness of cap and shell are selected such that this deformation is within the proportional limits for the metal of which wall 16 is formed. In this embodiment, if it is necessary to remove cap 14 to gain access to the contents of this container, the capping tool can be used to apply force to do so, and the wall of the shell will then return to its original configuration. In another embodiment, the deformation is within the limits of plastic deformation of that metal. In this second embodiment, if the cap is removed by force, the wall of the shell will not return to its original configuration.

Figure 2:
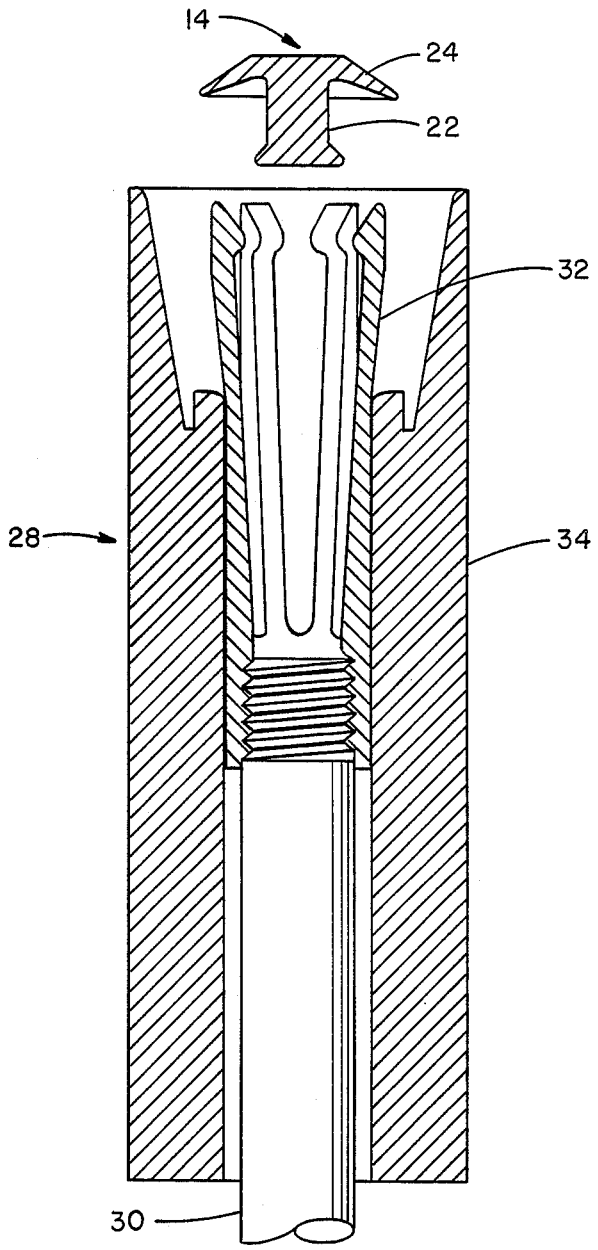
FIG. 2 is a vertical section of the container cap and capping tool.
Figure 3:
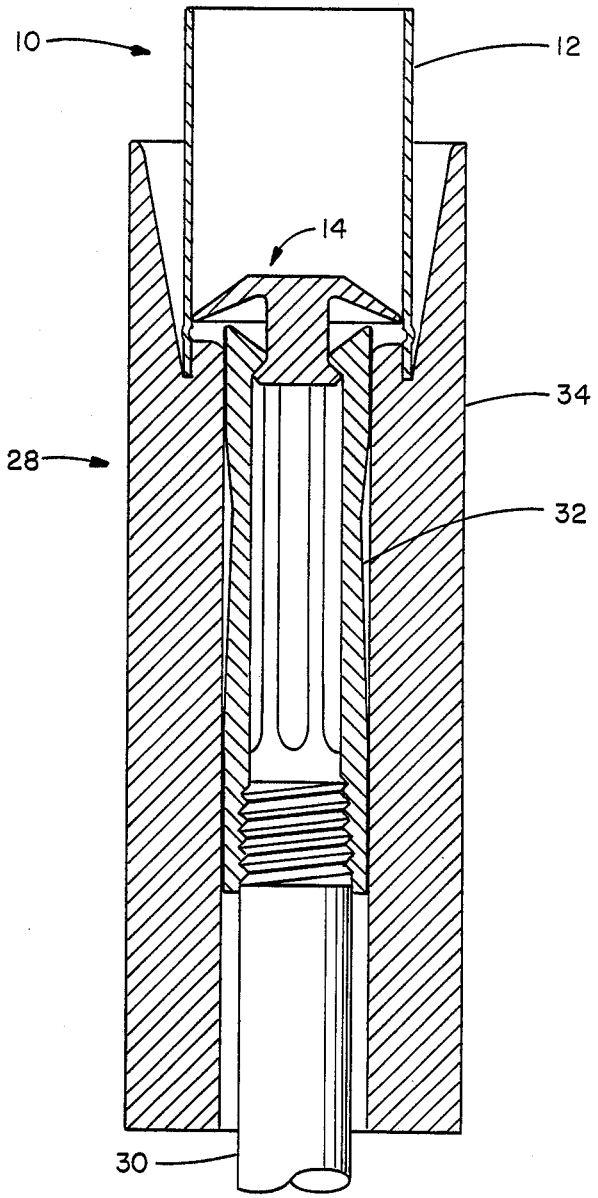
FIG. 3 is a vertical section of the container shell, cap, and capping tool before the container is sealed.

In FIG. 2 is shown the cap 14 of the metallic container and capping tool 28. Capping tool 28 has a pull-rod 30 which is attached to gripping fingers 32, which are constructed so as to grip stem 22 of cap 14. Pull rod 30 and gripping fingers 32 are moveably mounted within die 34 in such a manner that when cap 14 is held firmly by gripping fingers 32 and the pull rod 30 is moved relative to and in a direction so as to pull flange 24 of cap 14 against die 34. In FIG. 3 is shown cap 14 held by gripping fingers 32 of capping tool 28 and inserted inside container shell 12. Shell 12 rests against die 34 of capping tool 28.

Figure 4:
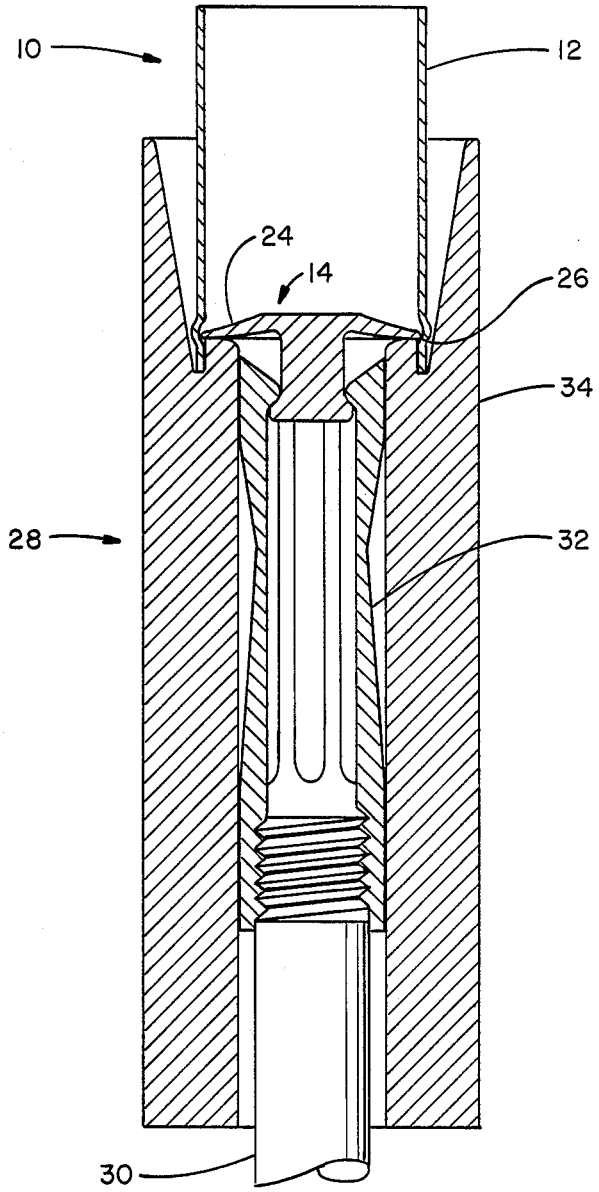
FIG. 4 is a vertical section of the container shell, cap, and capping tool after the container is sealed.

In FIG. 4 is shown cap 14 held by gripping fingers 32 of capping tool 28. Flange 24 of cap 14 has been deformed outward and a seal 26 has been formed between the edge of flange 24 and the wall 16 of containers shell 12. This has been accomplished by the application of force to pull rod 30 which has been noved within capping tool 28 in such a direction that flange 24 is pulled against die 34 deforming flange 24 outwardly to form seal 26 with container shell wall 16.

Figure 5:
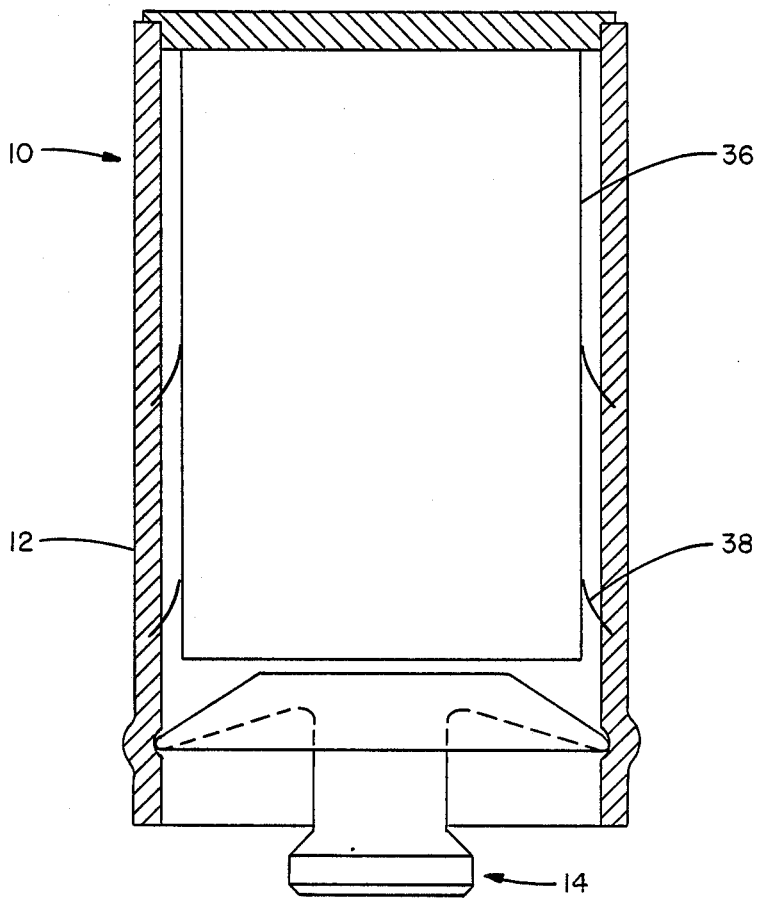
FIG. 5 is a vertical section of the sealed container shell and cap with a storage container enclosed therein.

In FIG. 5 is shown sealed metallic container 10 comprised of shell 12 and cap 14 being used as an overpack for a storage container for dangerous waste 36. In this embodiment, shell 12 has affixed inside the wall thereof retaining springs 38 which grip and hold the container of dangerous waste 36 within shell 12.

Figure 6:
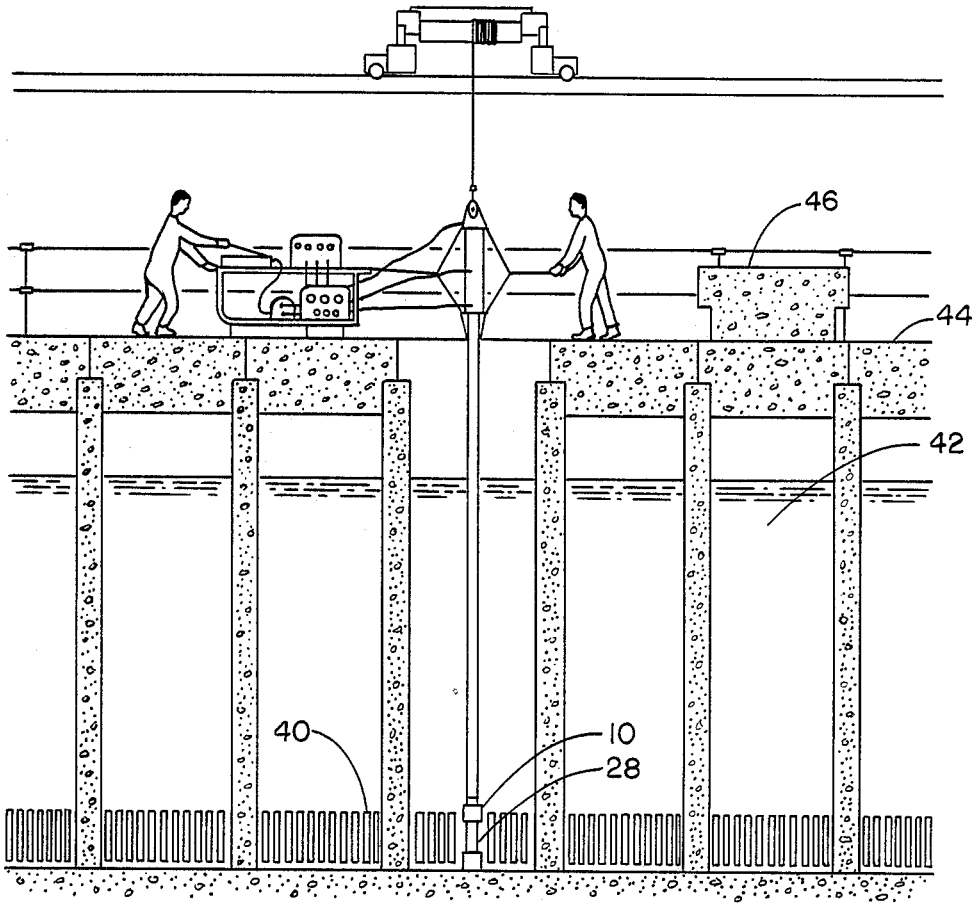
FIG. 6 is a drawing partially in section of a method of use of the invention.

FIG. 6 shows the manner in which the invention can be used remotely and underwater. Capsules of cesium and strontium 40 are stored under water in a storage basin 42. The storage basin itself has shielding 44. When a leaking capsule is located, a cover block 46 (removeable section of the shielding over the storage basin) is removed. Overpacking shell 10 is placed open end down over the leaking capsule and nitrogen is bubbled into the capsule, expelling water contained therein. The capping tool 28 with the cap held therein, connected to a hydraulic pump, which is used to apply force thereto, is placed on the bottom of the pool, with the cap of container 10 positioned so the narrow end of the flange points upward. The overpack shell which now contains the leaking capsule is positioned over and lowered onto the cap. The hydraulic cylinder is activated and the flange of the cap forced against the die of the capping tool so as to form a seal with the wall of the overpack shell. Then the capping tool is removed and the overpacked capsule left in the storage basin.

The foregoing description of the preferred embodiment of the invention has been presented for purposes of illustration and description. It is not intended to be exhaustive or to limit the invention to the precise form disclosed, and obviously many modifications and variations are possible in light of the above teaching. It is intended that the scope of the invention be defined by the claims appended thereto.

I claim:

1. A method of sealing a cylindrical metallic container having a open end comprising inserting within said open end a cap having a frusto-conical flange which fits closely within said container, then deforming the flange of said cap in a direction tending to flatten it, thereby forcing the periphery of the flange of said cap into and deforming said container so as to form a tight seal therewith.

2. An apparatus for producing a sealed metallic container comprising: a capping tool having a die, gripping fingers, and a pull-rod connected to the gripping fingers, said rod and gripping fingers being movably mounted within said die; a metallic cap having a stem formed to be held by the capping tool and, surrounding the stem, a frusto-conical flange; a metallic shell having an open end; means for positioning said metallic shell with said open end surrounding said frusto-conical flange while said stem is being held by said capping tool; and means for applying force to the pull rod of the capping tool.

3. An apparatus as described in claim 2 in which the relative dimensions of the flange of the cap, the diameter of the metallic shell, and the type of metal of which the shell is made are such that the deformation produced when the flange of the cap is forced by the capping tool into the wall is within the limit of plastic deformation for that metallic shell wall.

4. An apparatus as described in claim 2 in which the relative dimensions of the flange of the cap, the diameter of the metallic shell, and the type of metal of which the shell is made are such that the deformation produced when the flange of the cap is forced by the capping tool into the wall is within the proportional limit for that metal shell wall.

5. An apparatus as described in claim 2 further comprising a second container suited to store dangerous material, said second container being enclosed by the first-named container shell and cap after sealing, whereby, after sealing, said first-named container shell and cap form an overpack for said second container.

6. An apparatus as described in claim 5 further comprising: a plurality of retaining springs attached to the inside of the wall of the overpacking container.

* * * * *